United States Patent
Ohashi et al.

(10) Patent No.: US 9,730,292 B2
(45) Date of Patent: Aug. 8, 2017

(54) ILLUMINATION CONTROL DEVICE

(71) Applicant: YAZAKI CORPORATION, Tokyo (JP)

(72) Inventors: Tomonori Ohashi, Shizuoka (JP); Terumitsu Sugimoto, Shizuoka (JP); Hiroko Barasawa, Shizuoka (JP); Yasuo Suzuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/335,188

(22) Filed: Oct. 26, 2016

(65) Prior Publication Data

US 2017/0118816 A1 Apr. 27, 2017

(30) Foreign Application Priority Data

Oct. 27, 2015 (JP) ................. 2015-211039

(51) Int. Cl.
*H05B 33/08* (2006.01)
*H05B 37/02* (2006.01)
*B60Q 3/80* (2017.01)

(52) U.S. Cl.
CPC ........... *H05B 33/0866* (2013.01); *B60Q 3/80* (2017.02); *H05B 37/0227* (2013.01)

(58) Field of Classification Search
CPC H05B 33/08; H05B 33/0866; H05B 33/0863; H05B 37/02; H05B 37/0227; B60Q 3/16; B60Q 3/18
See application file for complete search history.

(56) References Cited

U.S. PATENT DOCUMENTS

| | | | |
|---|---|---|---|
| 9,420,671 B1 * | 8/2016 | Sugimoto | H05B 37/0281 |
| 2010/0052536 A1 | 3/2010 | Zielinski et al. | |
| 2010/0301777 A1 * | 12/2010 | Kraemer | H05B 33/0803 |
| | | | 315/312 |
| 2012/0019164 A1 | 1/2012 | Gambeski et al. | |
| 2012/0104953 A1 | 5/2012 | Chobot | |
| 2015/0229919 A1 | 8/2015 | Weber et al. | |
| 2015/0230310 A1 | 8/2015 | Sugaya | |
| 2016/0353083 A1 * | 12/2016 | Aoki | G06T 7/521 |
| 2016/0353550 A1 * | 12/2016 | Baaijens | H05B 37/0218 |

FOREIGN PATENT DOCUMENTS

| | | |
|---|---|---|
| JP | 2007-59179 A | 3/2007 |
| JP | 2008-117713 A | 5/2008 |
| JP | 2008-153039 A | 7/2008 |
| JP | 2008-251337 A | 10/2008 |
| JP | 2010-538434 A | 12/2010 |
| JP | 2012-119141 A | 6/2012 |
| JP | 2014-134527 A | 7/2014 |
| JP | 2015-167120 A | 9/2015 |

* cited by examiner

*Primary Examiner* — Thai Pham
(74) *Attorney, Agent, or Firm* — Kenealy Vaidya LLP (57) ABSTRACT

An illumination control device includes a control portion which controls light emission states of luminous bodies and having different light emission colors from one another, so that a cabin is illuminated by emitted light emitted from a light source and having predetermined chromaticity. The light source has the luminous bodies. The control portion controls the light emission states of the luminous bodies in accordance with a correction coefficient inputted from outside to adjust the chromaticity of the emitted light.

1 Claim, 8 Drawing Sheets

ILLUMINATION CONTROL DEVICE

CROSS REFERENCE TO RELATED APPLICATIONS

This application is based on Japanese Patent Application (No. 2015-211039) filed on Oct. 27, 2015, the contents of which are incorporated herein by reference.

BACKGROUND OF THE INVENTION

1. Field of the Invention

The present invention relates to an illumination control device which can be used for illumination of a vehicle etc.

2. Description of the Related Art

For example, it is assume that a cabin is illuminated in a vehicle such as a passenger vehicle. In this case, it is desired that the cabin is illuminated by illumination light with proper chromaticity in accordance with the state at that time. In such an application, for example, a full-color LED device containing a plurality of light-emitting elements (LEDs: Light-Emitting Diodes) emitting lights at red (R), green (G) and blue (B) color wavelengths respectively is used as a light source. Thus, it is possible to obtain illumination light with various chromaticities if necessary.

On the other hand, a related-art technique for calibrating an illumination device is disclosed, for example, in JP-A-2007-59179. In the illumination device according to JP-A-2007-59179, illumination light is radiated to an illuminance/chromaticity calibration tool provided with an RGB color pattern, intensities of lights emitted from respective color LED groups are acquired in accordance with the respective R, G and B color components based on a result of imaging the color pattern by a CCD camera, and characteristics about illuminances and chromaticities of the respective color LED groups are calculated.

In addition, JP-T-2010-538434 (WO2009/034060) discloses a technique for adjusting the color, color temperature or chromaticity coordinates of mixed light radiated from an LED spot light so as to keep the color, color temperature or chromaticity coordinates of the mixed light constant. In addition, JP-A-2014-134527 discloses a technique for calibrating a variation (machine difference) in a measurement result caused by the type of an LED measurement device used for inspection of an LED.

For example, when a full-color LED device is used as a light source, the device itself has a very large individual difference in light emission characteristic. Therefore, when the full-color LED device is used as a light source of an illumination device for illuminating a cabin, there is a case in which illumination light with desired chromaticity estimated at design cannot be obtained.

In addition, an LED light source has a small light emission quantity in comparison with an ordinary lamp. Therefore, it is necessary to dispose a plurality of LED light sources at a plurality of places respectively in a cabin and light these light sources simultaneously in order to illuminate the cabin as a whole. However, since there is a large variation in light-emitting characteristic due to individual differences among the LED devices, hue of illumination perceived by a user may differ from one place to another in the cabin.

Accordingly, it is necessary to suppress the hue of the illumination from differing from one place to another, or to perform the illumination so as to obtain illumination light with desired chromaticity. Accordingly, special LED devices which have been selected beforehand must be used so that individual differences among the LED devices in actual use can be limited to be small. In addition, only the special LED devices selected in conformity with predetermined criterions are allowed to be used. Accordingly, component cost of each LED device to be used inevitably increases greatly in comparison with an ordinary LED device.

SUMMARY OF THE INVENTION

The invention has been accomplished in consideration of the aforementioned circumstances. An object of the invention is to provide an illumination control device which does not limit a light source to be used, only to a preliminarily selected special LED device but can easily obtain illumination light with desired chromaticity.

In order to achieve the aforementioned object, the illumination control device according to the invention is characterized in the following paragraphs (1) to (4).

(1) An illumination control device including:
a control portion that controls light emission states of luminous bodies having different light emission colors from one another, so that a cabin is illuminated by emitted light emitted from a light source and having predetermined chromaticity; the light source having the luminous bodies, wherein the control portion controls the light emission states of the luminous bodies in accordance with a correction coefficient inputted from outside to adjust the chromaticity of the emitted light.

According to the illumination control device having the aforementioned configuration (1), even when the light source has a large variation in light emission characteristic or the light emission characteristic thereof has changed due to the influence of deterioration over time etc., the correction coefficient inputted to the control portion can be calibrated so that illumination light with desired chromaticity can be obtained. Accordingly, it is unnecessary to use any preliminarily selected special device as the light source, so that it is possible to reduce the cost of the illumination device.

(2) The illumination control device stated in the aforementioned paragraph (1), further including:
an input portion that accepts adjustment of the chromaticity of the emitted light; and
an upstream side control portion that outputs, to the control portion, the correction coefficient corresponding to information inputted to the input portion.

According to the illumination control device having the aforementioned configuration (2), even when the chromaticity of the emitted light of the light source differs from the predetermined chromaticity, it is possible to adjust the chromaticity of the emitted light through the input portion. Accordingly, even after the light source is assembled in a vehicle and the vehicle is shipped, a dealer or a user can adjust the chromaticity.

(3) The illumination control device stated in the aforementioned paragraph (1), further including:
an upstream side control portion that receives a signal expressing chromaticity measured by a chromaticity measuring instrument measuring the chromaticity of the emitted light, calculates the correction coefficient in accordance with a difference between the predetermined chromaticity and the measured chromaticity, and transmits the calculated correction coefficient to the control portion.

According to the illumination control device having the aforementioned configuration (3), the upstream side control portion calculates a difference between actual chromaticity measured by the predetermined chromaticity measuring instrument and the predetermined chromaticity. Accordingly, it is possible to control the light source based on the difference so that it is possible to make the chromaticity of the emitted light approximate to the predetermined chromaticity.

(4) The illumination control device stated in the aforementioned paragraph (3), wherein the control portion has a calibration mode to be executed when the chromaticity measuring instrument measures the chromaticity, wherein the control portion controls the light source to a predetermined reference light emission state in the calibration mode; and wherein when there are a plurality of the light sources as targets to be controlled, the control portion controls the plurality of light sources respectively in accordance with a plurality of light emission patterns different from one another in the calibration mode.

According to the illumination control device having the aforementioned configuration (4), the light source is controlled to the predetermined reference light emission state when the chromaticity measuring instrument measures the chromaticity. Accordingly, a difference between target chromaticity and chromaticity in an actual light emission state can be detected easily. In addition, when there are a plurality of the light sources, the light sources emit lights in accordance with light emission patterns different from one another. Accordingly, based on the type of each light emission pattern, it is possible to identify which one of the light sources brought a measurement result of chromaticity measured by the chromaticity measuring instrument. Accordingly, it is easy to specify individual differences of the light sources respectively.

According to the illumination control device according to the invention, the light source to be used is not limited only to a preliminarily selected special LED device but illumination light with desired chromaticity can be obtained easily. That is, even when the light source has a large variation in light emission characteristic or the light emission characteristic thereof has changed due to the influence of deterioration over time, etc., it is possible to calibrate the correction coefficient inputted to the control portion to thereby obtain the illumination light with the desired chromaticity.

The invention has been described above briefly. Further, when undermentioned modes (hereinafter referred to as "embodiments") for carrying out the invention are read through with reference to the accompanying drawings, details of the invention can be made further clear.

DETAILED DESCRIPTION OF THE EXEMPLARY EMBODIMENTS

Specific embodiments as to the invention will be described below with reference to the drawings.
(First Embodiment)
<Configuration Example of System>

Figure 1:
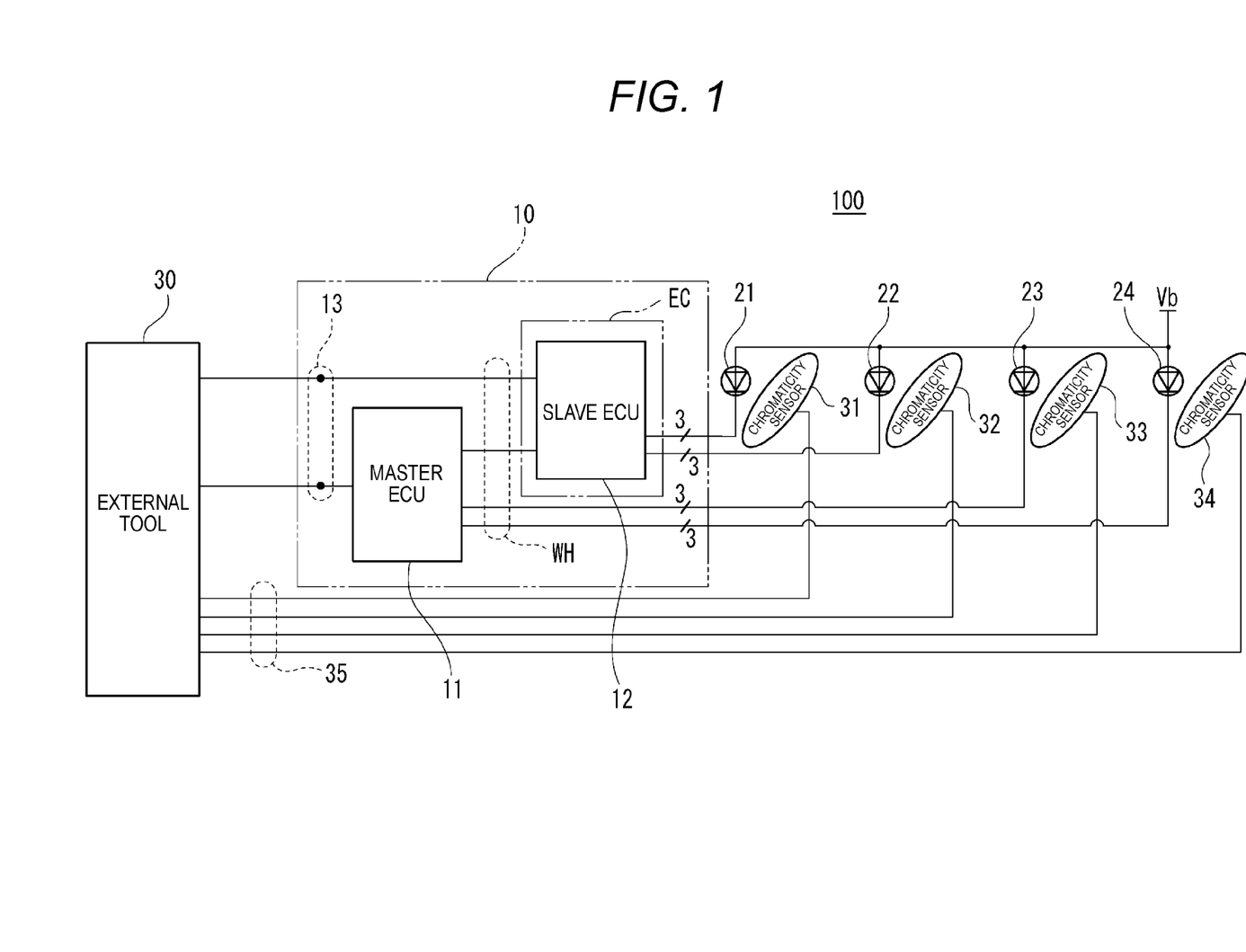
FIG. 1 is a block diagram showing a configuration example (1) of a calibration system for a vehicle, which includes an illumination control device according to an embodiment of the invention.

A configuration example (1) of a calibration system 100 for a vehicle, which includes an illumination control device according to an embodiment of the invention, is shown in FIG. 1. The calibration system 100 shown in FIG. 1 is provided with an illumination control device 10, an external tool 30, LED devices 21 to 24, and chromaticity sensors 31 to 34.

The LED devices 21 to 24 serve as light sources respectively for illuminating a cabin of the vehicle. Specifically, each of the LED devices 21 to 24 uses a full-color LED containing three LED (Light-Emitting Diode) elements emitting lights at R (Red), G (Green) and B (Blue) color wavelengths respectively. These LED devices 21 to 24 are disposed at different places in the cabin respectively so that various places in the cabin can be illuminated by the LED devices 21 to 24 with proper light quantities and proper chromaticities.

The illumination control device 10 is a device for controlling the illuminations performed by the LED devices 21 to 24. The illumination control device 10 is provided with a master ECU (Electronic Control Unit) 11, and a slave ECU 12. The master ECU 11, the slave ECU 12, and the LED devices 21 to 24 are connected to one another by a wire harness WH.

An upstream side end portion of the wire harness WH is connected to the master ECU 11. An electronic circuit of the salve ECU 12 is built internally in a connector EC provided in the upstream side end portion of the wire harness WH. A downstream side of the salve ECU 12 is connected to the LED devices 21 and 22 through a predetermined sub harness.

In the configuration shown in FIG. 1, two LED devices 21 and 22 are connected under the slave ECU 12 and the other two LED devices 23 and 24 are connected under the master ECU 11.

A power supply line for supplying electric power of a power source, a ground line, and a communication line are included in the wire harness WH. By use of the communication line, data communication between the master ECU 11 and the slave ECU 12 can be performed. By the data communication, the master ECU 11 can transmit commands or various information to the salve ECU 12 or acquire various information from the slave ECU 12.

Although only one slave ECU 12 is used in the configuration of FIG. 1, two or more independent slave ECUs 12 may be connected under the master ECU 11 through the wire harness WH. Accordingly, even in a case where it is necessary to control a large number of LED devices disposed to be dispersed at various places as in an actual vehicle, the plurality of slave ECUs 12 can be used to control these LED devices in accordance with an instruction of the master ECU 11. In addition, the electronic circuit of the slave ECU 12 is disposed inside the connector EC on the downstream side of the wire harness in the configuration of FIG. 1. However, the slave ECU 12 may be disposed inside any of various devices fixed to the interior of the vehicle.

The external tool 30 is an independent electronic device different from an in-vehicle system. The external tool 30 is connected to the illumination control device 10 through an external tool connecting portion 13 only when work for calibrating illuminations of the LED devices 21 to 24 is performed. In addition, after the calibration is completed, the external tool 30 can be detached from the external tool connecting portion 13 to be separated from the in-vehicle system.

In the same manner as various electronic control units for use in a vehicle, the external tool 30 can be constituted by hardware of an electronic circuit which is mainly composed of a control microcomputer, and software which is required for implementing the function of the external tool 30.

The plurality of chromaticity sensors 31 to 34 can be connected to a body of the external tool 30 through a connection cable 35. When the LED devices 21 to 24 are calibrated, the chromaticity sensor 31 is disposed in the vicinity of the LED device 21, the chromaticity sensor 32 is disposed in the vicinity of the LED device 22, the chromaticity sensor 33 is disposed in the vicinity of the LED device 23, and the chromaticity sensor 34 is disposed in the vicinity of the LED device 24, as shown in FIG. 1.

The external tool 30 has a function of individually calculating proper correction coefficients required for calibrating chromaticities of illumination lights of the LED devices 21 to 24, based on differences between the chromaticities which have been measured by the chromaticity sensors 31 to 34 respectively and reference chromaticities which have been determined beforehand. In addition, the external tool 30 can transmit data of the calculated correction coefficients to the master ECU 11 and the salve ECU 12.

The master ECU 11 reflects the correction coefficients received from the external tool 30 on control of the LED devices 23 and 24, and corrects electric conduction duty cycles accordingly so that proper chromaticities can be obtained in the illumination lights of the LED devices 23 and 24. In addition, the slave ECU 12 reflects the correction coefficients received from the external tool 30 on control of the LED devices 21 and 22, and corrects electric conduction duty cycles so that proper chromaticities can be obtained in the illumination lights of the LED devices 21 and 22. Incidentally, the correction coefficients to be inputted by the salve ECU 12 may be directly received from the external tool 30 or may be received via the master ECU 11.

<Description of Detailed Configuration>

Figure 2:
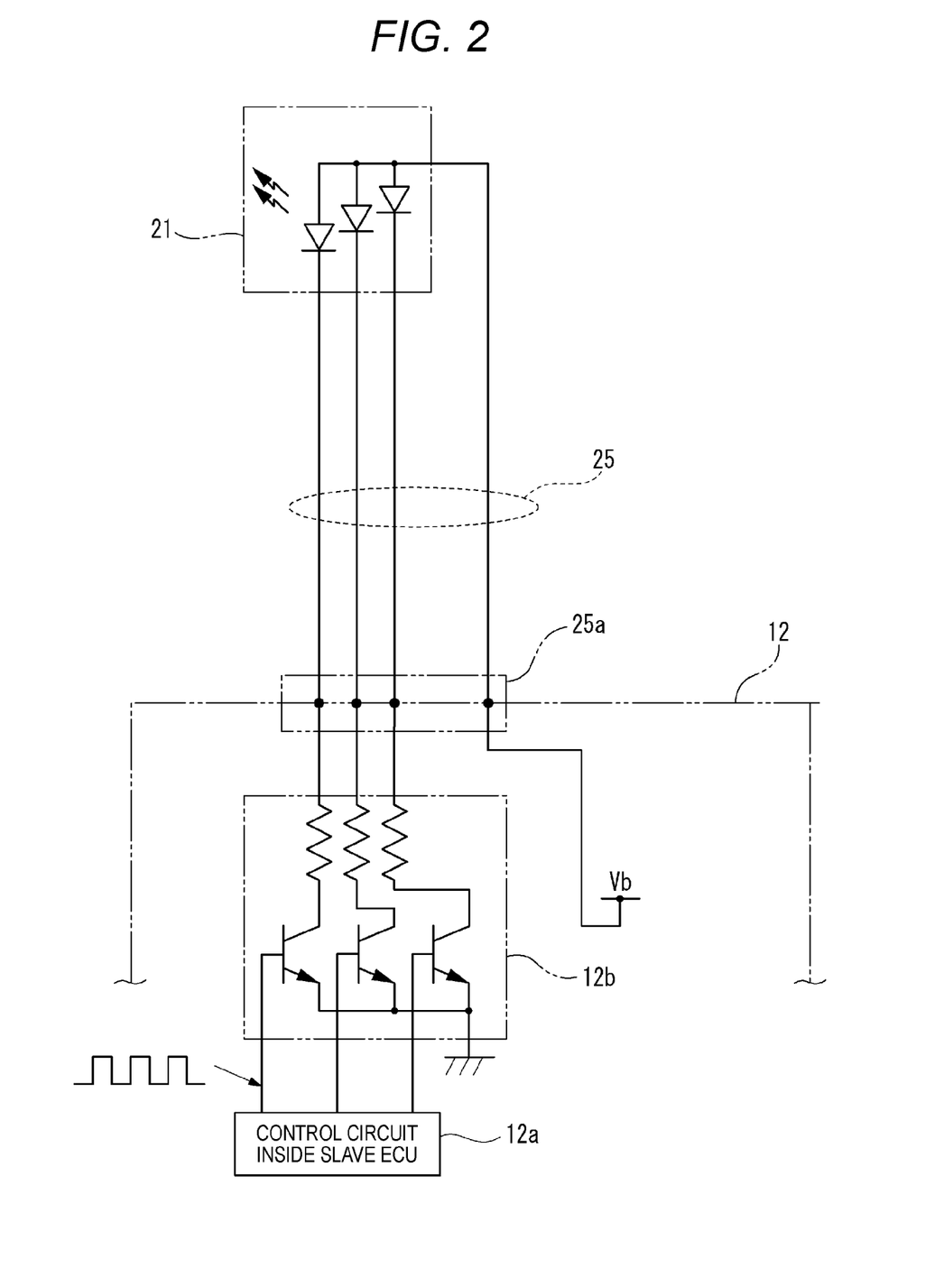
FIG. 2 is an electric circuit diagram showing a specific connection example for connecting a slave ECU and an LED device to each other.

A specific connection example for connecting the slave ECU 12 and the LED device 21 to each other is shown in FIG. 2. As shown in FIG. 2, the LED device 21 contains three LED (Light-Emitting Diode) elements emitting lights at R (Red), G (Green) and B (Blue) color wavelengths respectively. Anodes (positive electrodes) of the three LED elements are connected to a line of the sub harness 25 shared by the anodes (positive electrodes), and cathodes (negative electrodes) of the three LED elements are connected to three lines of the sub harness 25 individually respectively. The other LED devices 22 to 24 are also the same.

A connector 25a on an upstream side of the sub harness 25 is connected to an output side of the slave ECU 12. A control circuit 12a and an LED driver 12b are provided internally in the slave ECU 12.

Three switching elements (e.g. transistors) and three resistors are provided in order to switch the three LED elements inside the LED device 21 individually. A predetermined DC voltage Vb is supplied from the slave ECU 12 to the anode sides of the three LED elements inside the LED device 21 through the sub harness 25.

The control circuit 12a can give a control signal to each of control input terminals (bases) of the three switching elements inside the LED driver 12b to thereby control ON/OFF of the switching element individually. In addition, when the control signal is changed periodically in a pulse shape to thereby adjust a duty cycle between an ON section and an OFF section, an average value of a current flowing into each of the LED elements can be controlled. In this manner, the light quantities of respective R, G and B color illumination lights can be adjusted. In addition, illumination light with various chromaticities can be obtained by combination of the R, G and B light quantities.

Incidentally, the full-color LED device generally has a large individual difference in light emission characteristic. Accordingly, even in the case where R, G and B ratios in the duty cycle for driving the three LED elements inside the LED device 21 are fixed, a large variation occurs in chromaticity of the obtained illumination light. In order to correct the variation, the slave ECU 12 uses a correction coefficient calculated by the external tool 30. The control circuit 12a reflects the correction coefficient on the duty cycle of the control signal given to the LED driver 12b.

<Operation When Calibration of Illumination Chromaticity is Performed>

Figure 3:
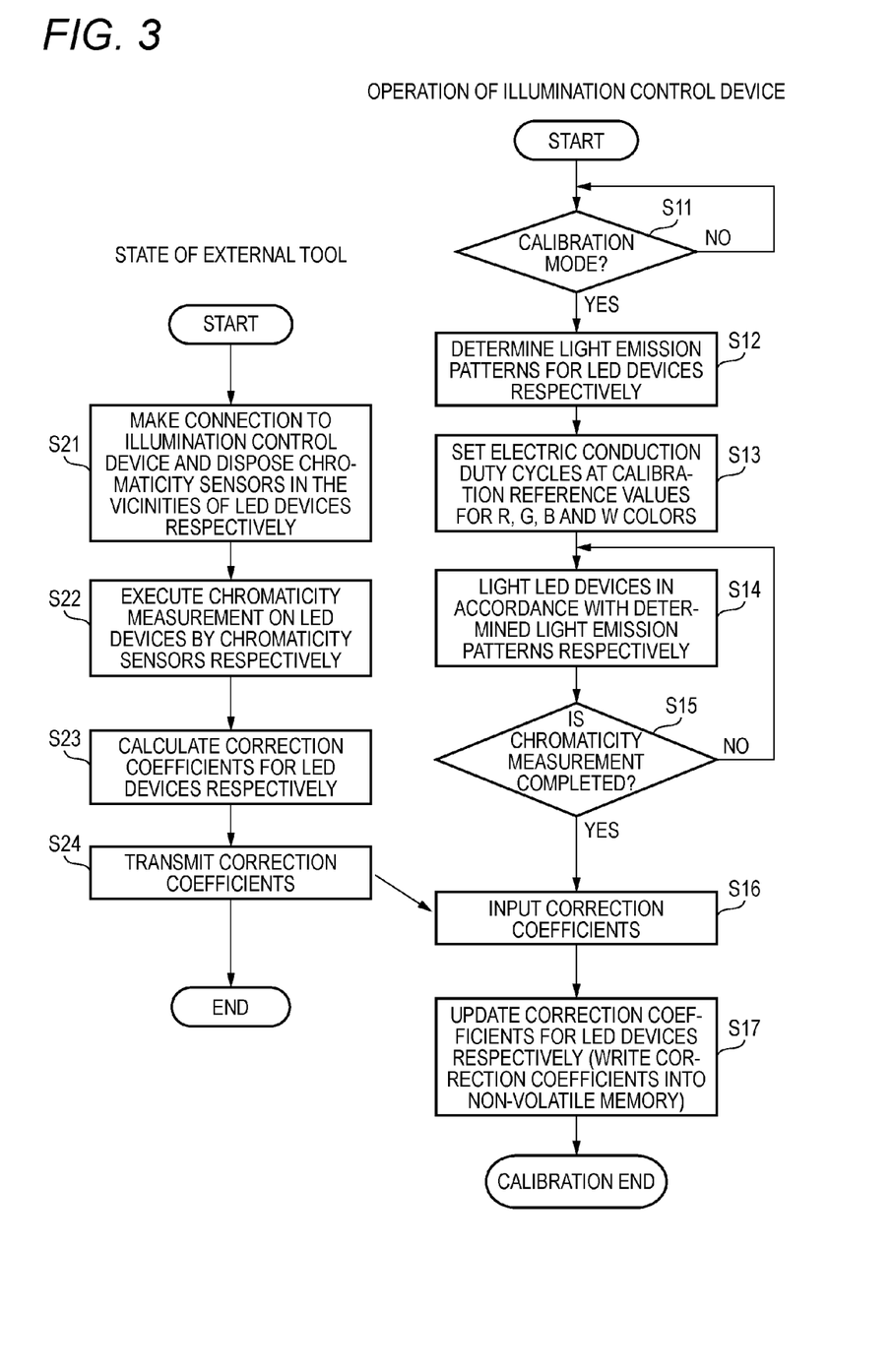
FIG. 3 is a flow chart showing an operating and working procedure of a whole calibration system in which an external tool is used.

An operating and working procedure of the whole calibration system 100 in which the external tool 30 in FIG. 1 is used is shown in FIG. 3.

It can be assumed that illumination chromaticity calibrating work is performed prior to shipment, for example, in a vehicle manufacturing factory in the case where devices having large individual differences in light emission characteristic are used as the LED devices 21 to 24 shown in FIG. 1. Or it can be assumed that the illumination chromaticity calibrating work is performed in consideration of the influence of deterioration over time etc. after shipment of the vehicle by a vehicle dealer who performs maintenance of the vehicle in order to maintain the quality of the vehicle. In any of such cases, a worker performs the work using the external tool 30 so that operation shown in FIG. 3 can be performed.

For performing the calibrating work, the worker prepares the external tool 30, and connects the external tool 30 to the external tool connecting portion 13 of the illumination control device 10. Further, the worker disposes the chromaticity sensors 31 to 34 in the vicinities of the LED device 21 to 24 on the vehicle respectively in the state that the chromaticity sensors 31 to 34 are connected to the body of the external tool 30 through the connection cable 35 so that chromaticity measurement can be performed (S21).

When operation of the external tool 30 is started, the external tool 30 performs chromaticity measurement on the LED devices 21 to 24 individually by use of the chromaticity sensors 31 to 34 during light emission of the LED devices 21 to 24 (S22). As will be described later, the LED devices 21 to 24 emit lights in accordance with predetermined light emission patterns different from one another. Accordingly, the external tool 30 can manage information about chromaticities measured by the chromaticity sensors 31 to 34 respectively in the state where the information about the measured chromaticities has been associated with the LED devices 21 to 24 respectively based on identification of the light emission patterns.

The external tool 30 calculates correction coefficients for the LED devices 21 to 24 respectively based on results of the chromaticity measurement obtained in the step S21 (S23). For example, differences between measured values of respective R, G, and B color components obtained when the LED device 21 is emitting light in white and reference values of the R, G and B color components are combined to form a correction coefficient. In addition, when, for example, two bits are assigned to each of the R, G and B color components, the correction coefficient for one LED device can be expressed by 6 bits (2×3).

The external tool 30 transmits data of the correction coefficients calculated in the step S23 to the master ECU 11 and the slave ECU 12 (S24). Here, when identification results of the light emission patterns are reflected, suitable correspondence between the correction coefficients and the LED devices 21 to 24 can be attained. For example, the external tool 30 transmits data of the correction coefficients in a sequence depending on the types of the light emission patterns, or transmits data of the correction coefficients added with the identification information corresponding to the types of the light emission patterns.

On the other hand, the master ECU 11 or the slave ECU 12 identifies whether a calibration mode has been designated or not (S11). When the mode is changed to the calibration mode, the master ECU 11 or the slave ECU 12 goes to a step S12. For example, upon detection of the fact that the external tool 30 has been connected to the external tool connecting portion 13 or upon detection of a predetermined switch operation by a user, the master ECU 11 changes the mode to the calibration mode. In addition, as soon as the master ECU 11 changes the mode to the calibration mode, the master ECU 11 issues an instruction to change the mode to the calibration mode, to the slave ECU 12.

The master ECU 11 or the slave ECU 12 determines a light emission pattern in the calibration mode for each of the LED devices (21 to 24) connected under the master ECU 11 or the slave ECU 12 (S12). The light emission pattern is selected from a plurality of light emission patterns (which will be described later) which have been prepared beforehand, so that the plurality of LED devices (21 to 24) can be assigned to have light emission patterns different from one another. That is, the LED devices 21 to 24 can be distinguished from one another based on differences of the light emission patterns.

The master ECU 11 or the slave ECU 12 assigns a predetermined calibration reference value (constant) to each of the colors of R, G, B and W (White) for an electric conduction duty cycle with which each of the LED devices (21 to 24) connected under the master ECU 11 or the slave ECU 12 can be lit in the calibration mode (S13).

The master ECU 11 or the slave ECU 12 controls an electric conduction state of each of the LED devices (21 to 24) connected under the master ECU 11 or the slave ECU 12, based on the electric conduction duty cycle assigned in the step S13 and the light emission pattern determined in the step S12 (S14). Accordingly, the LED devices 21 to 24 emit R, G, B or W color light.

When the chromaticity measurement is completed, operations of the master ECU 11 and the slave ECU 12 go from a step S15 to a step S16. For example, in the case where a fixed time has elapsed since a shift to the calibration mode, in the case where a predetermined input operation from the user has been has been detected, or in the case where a predetermined completion signal has been inputted from the external tool 30, the master ECU 11 and the slave ECU 12 recognize it as completion of the chromaticity measurement.

The master ECU 11 or the slave ECU 12 accepts the input of the correction coefficients transmitted from the external tool 30 in the calibration mode (S16). The correction coefficients for the LED devices 21 to 24, which have been grasped by the master ECU 11 and the slave ECU 12, are updated to latest information inputted in the step S16. The correction coefficients are written into a non-volatile memory (not shown) provided on the master ECU 11 or the slave ECU 12 (S17).

<Configuration Example of More Practicable Cabin Illumination System>

Figure 4:
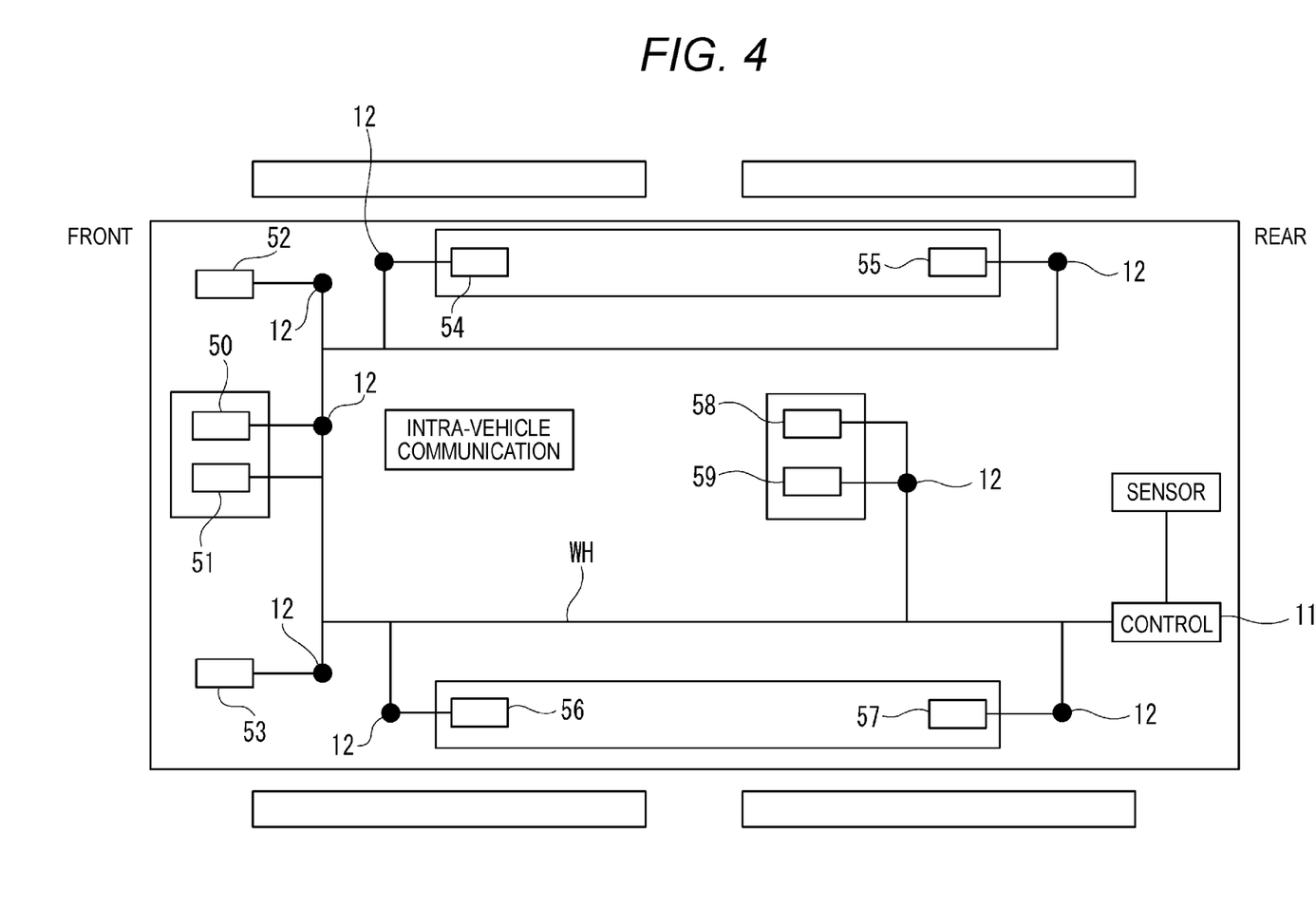
FIG. 4 is a block diagram showing a configuration example of a cabin illumination system mounted in a vehicle.

A configuration example of a cabin illumination system mounted in a vehicle is shown in FIG. 4.

In the cabin illumination system shown in FIG. 4, a large number of LED devices 50 to 59 for illumination are disposed to be dispersed at various places in the cabin. These LED devices 50 to 59 are connected to a master ECU 11 via a wire harness WH. Connectors (EC) are connected to downstream side end portions of the wire harness WH respectively, and slave ECUs 12 are provided internally in the connectors respectively. The LED devices 50 to 59 are connected under the slave ECUs 12 located in the vicinities of the LED devices 50 to 59.

Since a communication line is included in the wire harness WH, data communication can be performed between the master ECU 11 and each of the slave ECUs 12. Accordingly, the function of the calibration system 100 shown in FIG. 1 can be also applied directly to the cabin illumination system shown in FIG. 4.

<Specific Example for Light Emission Patterns>

Figure 5:
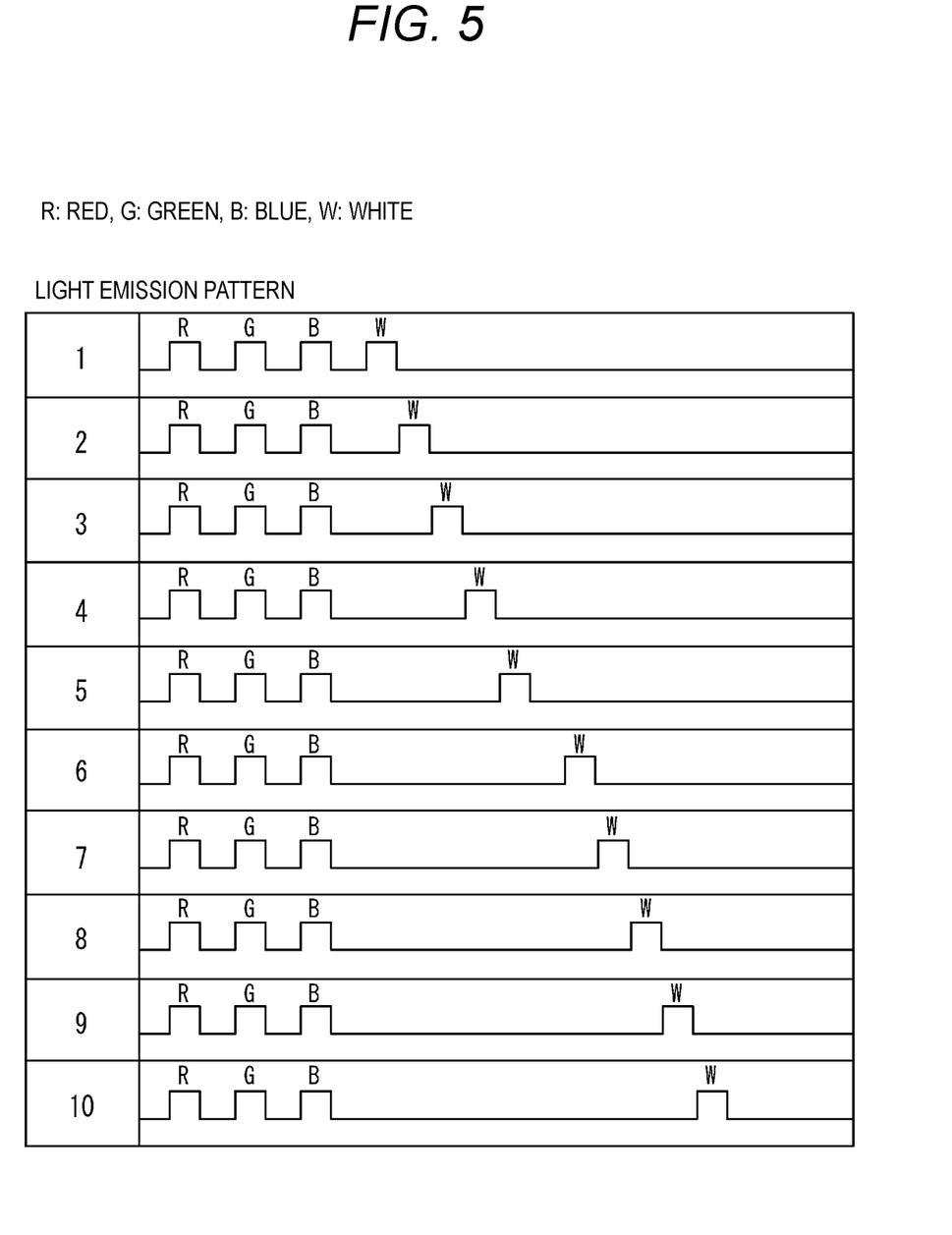
FIG. 5 is a schematic view showing a specific example for a plurality of predetermined light emission patterns.

A specific example for predetermined light emission patterns is shown in FIG. 5.

In the example shown in FIG. 5, each of ten types of light emission patterns is constituted by a combination of R color light emission, G color light emission, B color light emission and W color light emission. However, the length of a delay time between emission of the B color light and emission of the W color light differs from one light emission pattern to another.

For example, when calibration control of the cabin illumination system shown in FIG. 4 is performed, the ten types of light emission patterns shown in FIG. 5 can be assigned to the ten LED devices 50 to 59 respectively.

The external tool 30 shown in FIG. 1 can distinguish the differences of the lengths of the delay times shown in FIG. 5 when light emission states of the LED devices are measured by the chromaticity sensors (31 to 34).

Accordingly, the external tool 30 can identify the light emission patterns so that the LED devices 50 to 59 as targets to be measured can be distinguished from one another.

(Second Embodiment)
<Configuration Example of System>

Figure 6:
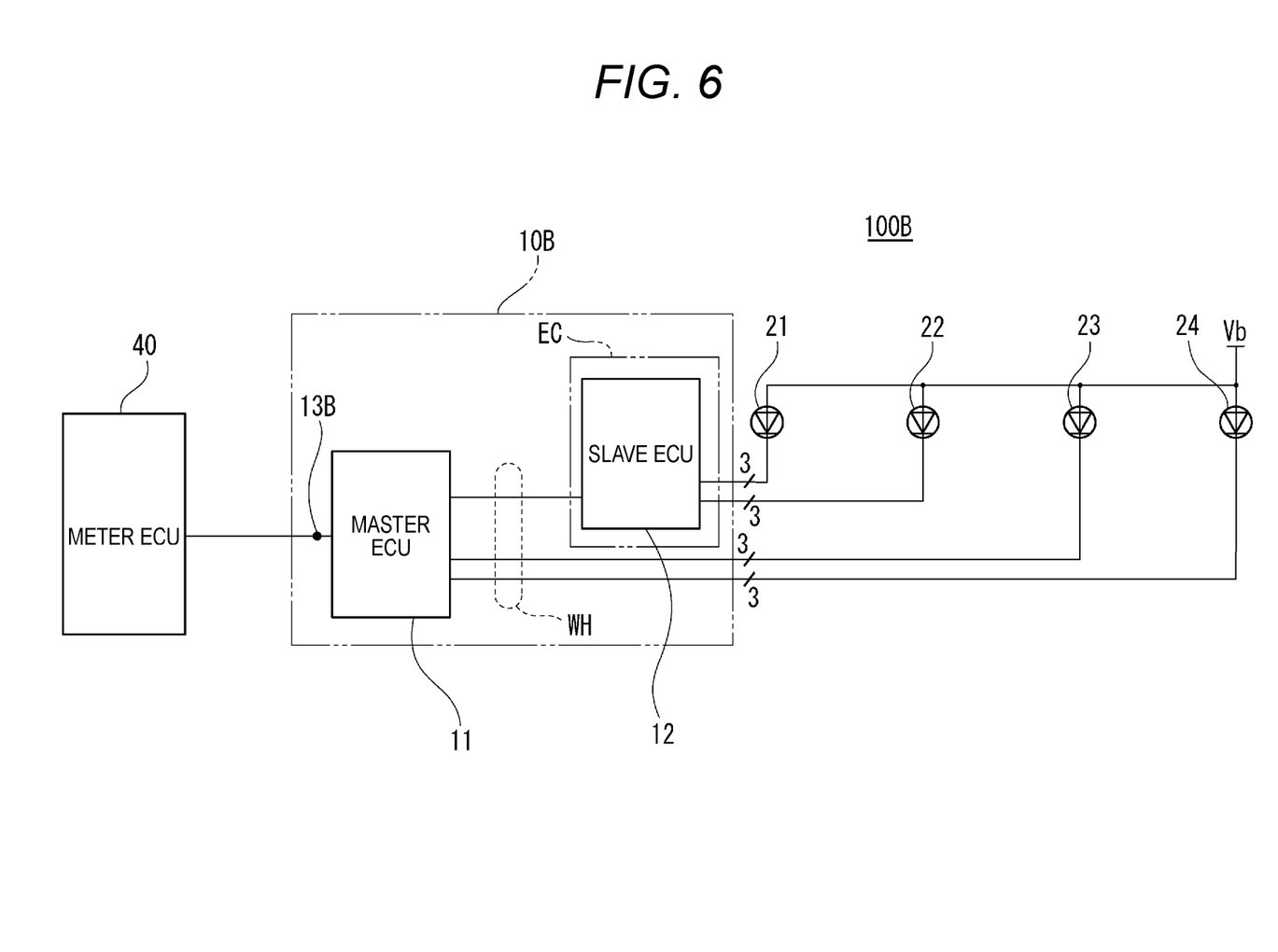
FIG. 6 is a block diagram showing a configuration example (2) of a calibration system for a vehicle, which includes an illumination control device according to an embodiment of the invention.

A configuration example (2) of a calibration system 100B for a vehicle, which includes an illumination control device according to an embodiment of the invention, is shown in FIG. 6. The calibration system 100B shown in FIG. 6 includes an illumination control device 10B, a meter ECU 40, and LED devices 21 to 24.

The meter ECU 40 is an electronic control unit which is built in a meter unit providing a function of an instrument panel on the vehicle. In the embodiment, the meter ECU 40 accepts a user's input operation for performing calibrating work on the illumination control device 10B. Incidentally, when change is made to allow the master ECU 11 inside the illumination control device 10B to execute control of the meter ECU 40, use of the meter ECU 40 becomes unnecessary.

In the same manner as that in the first embodiment, each of the LED devices 21 to 24 shown in FIG. 6 is a light source for illuminating a cabin of the vehicle. Specifically, each of the LED devices 21 to 24 uses a full-color LED containing three LED (Light-Emitting Diode) elements emitting lights at R (Red), G (Green) and B (Blue) color wavelengths respectively. These LED devices 21 to 24 are disposed at difference places in the cabin respectively so that various places in the cabin can be illuminated by the LED devices 21 to 24 with proper light quantities and proper chromaticities.

The illumination control device 10B is a device for controlling the illuminations performed by the LED devices 21 to 24. The illumination control device 10B includes a master ECU (Electronic Control Unit) 11 and a slave ECU 12. The master ECU 11, the slave ECU 12, and the LED devices 21 to 24 are connected to one another by a wire harness WH.

An upstream side end portion of the wire harness WH is connected to the master ECU 11. An electronic circuit of the slave ECU 12 is built internally in a connector EC provided in the upstream side end portion of the wire harness WH. A downstream side of the slave ECU 12 and each of the LED devices 21 and 22 are connected to each other through a predetermined sub harness.

In the configuration shown in FIG. 6, two LED devices 21 and 22 are connected under the slave ECU 12 and the other two LED devices 23 and 24 are connected under the master ECU 11.

A power supply line for supplying electric power of a power supply, a ground line, and a communication line are included in the wire harness WH. By use of the communication line, data communication can be performed between the master ECU 11 and the slave ECU 12. By the data communication, the master ECU 11 can transmit commands or various information to the slave ECU 12 or acquire various information from the slave ECU 12.

The master ECU 11 of the illumination control device 10B is connected to the meter ECU 40 through a meter connecting portion 13B. Practically, it can be assumed that the illumination control device 10B is connected to the meter ECU 40 via a communication network (e.g. CAN: Controller Area Network) provided in the interior of the vehicle.

In the calibration system 100B shown in FIG. 6, when illumination calibration is performed, the meter ECU 40 accepts an input operation from a user to determine correction values. The meter ECU 40 transmits the correction coefficients for the LED devices 21 to 24 to the master ECU 11.

<Operation when Calibration of Illumination Chromaticity is Performed>

Figure 7:
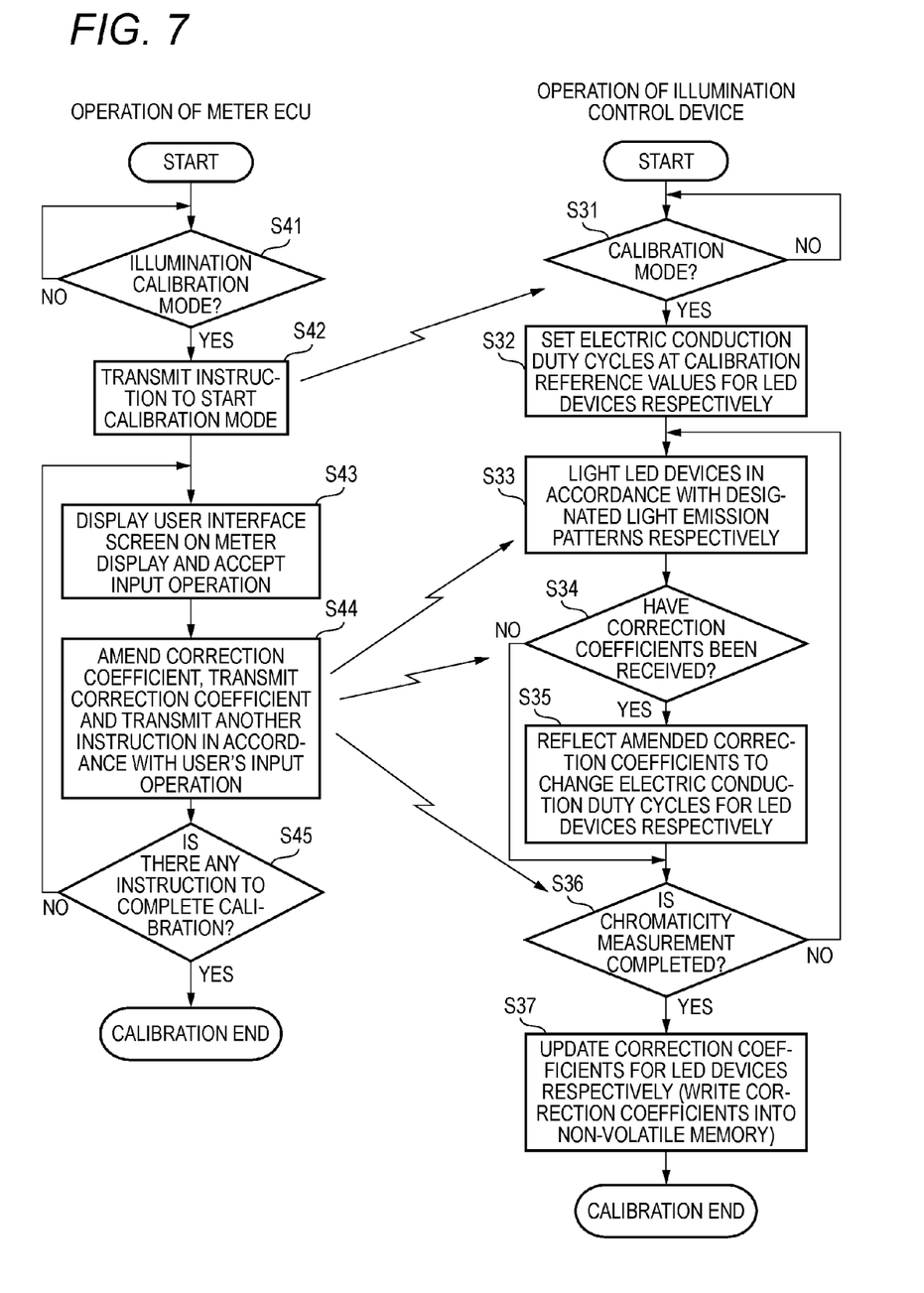
FIG. 7 is a flow chart showing operation of the whole calibration system in which control is made by only an in-vehicle system.

Operation of the whole calibration system in which an external tool 30 as in FIG. 1 is not used but control is made by only an in-vehicle system as in the calibration system 100B shown in FIG. 6 is shown in FIG. 7.

When devices having large individual differences in light emission characteristic are used as the LED devices 21 to 24 shown in FIG. 6, there is a possibility that chromaticity of illumination light obtained from each of the light sources (devices) may be deviated largely from its design value. For example, there is a possibility that significant differences may occur in chromaticities of the plurality of LED devices which should be emitting lights in the same color simultaneously, hue of illumination perceived by a user may differ from one place to another in the cabin, and the user may have a sense of wrongness.

Upon acceptance of an input operation from a user, the calibration system 100B shown in FIG. 6 performs illumination calibration so that a difference (variation) in chromaticity in an actual color of light emission from the LED devices can be suppressed or the chromaticity can be changed to chromaticity preferred by the user. When such calibrating work is performed, the operation in FIG. 7 is performed.

The meter ECU 40 monitors presence/absence of a user's input operation on a predetermined switch to thereby identify whether an instruction to change over the mode to an "illumination calibration mode" has been issued or not (S41). When the instruction to change over the mode has been issued, the meter ECU 40 goes to a step S42. The meter ECU 40 transmits an instruction to start the calibration mode, to the master ECU 11 of the illumination control device 10B (S42).

The meter ECU 40 uses a display screen of a display provided on a meter unit or a display provided in an in-vehicle device such as a car navigation device to display a user interface screen required for a user's input operation, and accepts the user's input operation (S43).

For example, by monitoring various switch states disposed on a steering wheel of the vehicle or in the vicinity of the steering wheel, the meter ECU 40 can detect a user's input operation for calibration work. In addition, when a touch panel is disposed on the display screen, an input operation on the touch panel may be detected.

The meter ECU 40 executes various processes in accordance with the detected user's input operation (S44). For example, the meter ECU 40 performs processes of: selecting an LED device as a target to be calibrated; selecting a light emission color (R, G, B, W) during calibration; correcting (increasing/decreasing) a correction coefficient; transmitting the corrected correction coefficient to the master ECU 11; etc. The meter ECU 40 repeats the processes unless it detects a predetermined calibration completion instruction (S43 to S45).

On the other hand, the master ECU 11 inside the illumination control device 10B shifts from a normal operating mode to the calibration mode in accordance with an instruction from the meter ECU 40, and goes from a step S31 to a step S32. Each of electric conduction duty cycles of the LED devices 23 and 24 connected under the master ECU 11 and the LED devices 21 and 22 connected under the slave ECU 12 is set at its calibration reference value. In addition, when a correction coefficient has been already held, the master ECU 11 changes the calibration reference value to one reflecting the value of the correction coefficient (S32).

The master ECU 11 and the slave ECU 12 located under the master ECU 11 light the LED devices (21 to 24) by use of designated light emission patterns and the electric conduction duty cycles determined in the step S32, in accordance with an instruction from the meter ECU 40 issued in response to a user's input operation.

Accordingly, for example, as to an R, G, B or W color light emission designated by the user, chromaticity of each of the LED devices (21 to 24) which is being lit can be adjusted by the user who is visually confirming the chromaticity of the lit LED device.

Upon reception of a corrected new correction coefficient from the meter ECU 40, the master ECU 11 reflects the corrected correction coefficient to change an electric conduction duty cycle of the LED device (21 to 24) (S34 to ST 35). In addition, the master ECU 11 periodically transmits the latest correction coefficient to the slave ECU 12.

Incidentally, the correction coefficient transmitted by the meter ECU 40 includes an R color component, a G color component and a B color component. When each of the R, G and B color components is expressed by 2-bit information, the correction coefficient corresponding to each of the LED devices is 6-bit information (2×3).

While the calibration mode is continuing, the master ECU 11 repeatedly executes the processes of the steps S33 to S36. When an instruction to complete the calibration mode is issued from the meter ECU 40, the master ECU 11 goes from the step S36 to a step S37, in which the finally determined correction coefficient of the LED device is written into an internal non-volatile memory.

<Specific Examples of Environment where Color Correction of Color Illumination is Performed>

Figure 8:
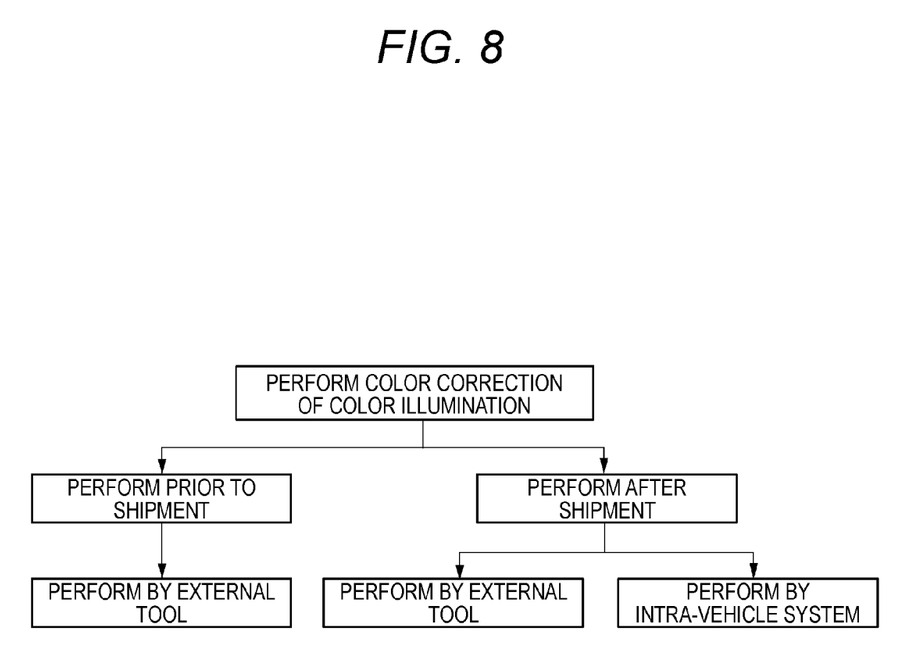
FIG. 8 is a schematic view showing specific examples of an environment in each of which color correction of color illumination is performed.

Specific examples of an environment where color correction of color illumination is performed are shown in FIG. 8. As to the environment where color correction of color illumination is performed on each of illumination devices on a vehicle, the color correction may be performed prior to shipment of the vehicle in some cases, and may be performed after the shipment in other cases, as shown in FIG. 8.

When the color correction is performed in a factory prior to shipment of the vehicle, the external tool 30 shown in FIG. 1 can be used. Accordingly, a correction coefficient for each of the LED devices can be determined by use of the aforementioned device shown in the "first embodiment" so that calibration can be performed. Accordingly, even when there is a large variation in light emission characteristic among the LED devices to be used, the LED devices can be controlled to obtain illumination lights with chromaticities estimated at design, and unevenness in chromaticity among different places can be also solved. Therefore, it is unnecessary to select the LED devices to be used so that it is possible to reduce the component cost of the LED devices.

On the other hand, even when the color correction has been performed in the factory prior to shipment of the vehicle, color correction of illumination may be required again due to the influence of deterioration over time etc. Therefore, it can be assumed that the color correction may be performed when a vehicle dealer performs maintenance of the vehicle after the shipment. On this occasion, the external tool 30 shown in FIG. 1 can be used. Accordingly, a correction coefficient for each of the LED devices can be determined by use of the aforementioned device shown in the "first embodiment" so that calibration can be performed. Thus, even when light emission characteristics of the LED devices in use have changed due to the influence of deterioration over time etc., the LED devices can be controlled to obtain illumination lights having chromaticities estimated at design, and unevenness in chromaticity from one place to another can be also solved.

In addition, even when the color correction has been performed in the factory prior to shipment of the vehicle, color correction of illumination may be required again due to the influence of deterioration over time etc. or hue may not fit user's preference. For this reason, the user himself/herself may have to perform the color correction. In this case, the user cannot use the external tool 30. Therefore, the user performs calibration using only the in-vehicle system as in the aforementioned device shown in the "second embodiment". By the calibrating work, a change in chromaticity of each of the LED devices due to the influence of deterioration over time or a variation in hue from one place to another can be amended or the hue can be adjusted in accordance with user's preference.

Here, the aforementioned characteristics of the embodiments of the illumination control device according to the invention will be summarized briefly and enumerated in the following paragraphs [1] to [7].

[1] An illumination control device (10) including:
a control portion (master ECU 11) that controls light emission states of luminous bodies having different light emission colors from one another, so that a cabin is illuminated by emitted light emitted from a light source (LED device 21 to 24) and having predetermined chromaticity, the light source having the luminous bodies,
wherein the control portion controls the light emission states of the luminous bodies in accordance with a correction coefficient inputted from outside to adjust the chromaticity of the emitted light (S16, S17, S34, S37).

[2] The illumination control device stated in the aforementioned paragraph [1], further including:
an input portion (S43) that accepts adjustment of the chromaticity of the emitted light; and
an upstream side control portion (meter ECU 40) that outputs, to the control portion, the correction coefficient corresponding to information inputted to the input portion (S44).

[3] The illumination control device stated in the aforementioned paragraph [1], further including:
an upstream side control portion (external tool 30) that receives a signal expressing chromaticity measured by a chromaticity measuring instrument (chromaticity sensor 31 to 34) measuring the chromaticity of the emitted light, calculates the correction coefficient in accordance with a difference between the predetermined chromaticity and the measured chromaticity (S22, S23), and transmits the calculated correction coefficient to the control portion (S24).

[4] The illumination control device stated in the aforementioned paragraph [3], further including:
a connection portion (external tool connecting portion 13) that connects the chromaticity measuring instrument detachably.

[5] The illumination control device stated in any one of the aforementioned paragraphs [1] through [4], wherein the correction coefficient is a correction coefficient for correcting a duty cycle for each of the luminous bodies.

[6] The illumination control device stated in the aforementioned paragraph [3], wherein the control portion has a calibration mode to be executed when the chromaticity measuring instrument measures the chromaticity, and the control portion makes control to bring the light source into a predetermined reference light emission state in the calibration mode (S13).

[7] The illumination control device stated in the aforementioned paragraph [6], wherein when there are a plurality of the light sources as targets to be controlled, the control portion controls the plurality of light sources respectively in accordance with a plurality of light emission patterns different from one another in the calibration mode (S12, S14).

Incidentally, the invention is not limited to the aforementioned embodiments, but modification, improvement, etc. can be made thereon suitably. In addition, as long as the invention can be achieved, the materials, shapes, dimensions, numbers, arrangement places, etc. of the respective constituent members in the aforementioned embodiments are not limited but can be changed desirably.

What is claimed is:
1. An illumination control device comprising:
a control portion that controls light emission states of luminous bodies having different light emission colors from one another, so that a cabin is illuminated by emitted light emitted from a light source and having predetermined chromaticity, the light source having the luminous bodies; and an upstream side control portion that receives a signal expressing chromaticity measured by a chromaticity measuring instrument measuring the chromaticity of the emitted light, calculates the correction coefficient in accordance with a difference between the predetermined chromaticity and the measured chromaticity, and transmits the calculated correction coefficient to the control portion, wherein the control portion controls the light emission states of the luminous bodies in accordance with a correction coefficient inputted from outside to adjust the chromaticity of the emitted light;

wherein the control portion has a calibration mode to be executed when the chromaticity measuring instrument measures the chromaticity;

wherein the control portion controls the light source to a predetermined reference light emission state in the calibration mode;

wherein when there are a plurality of the light sources as targets to be controlled, the control portion controls the plurality of light sources in accordance with a plurality of light emission patterns different from one another in the calibration mode;

wherein each of plurality of light emission patterns is constituted by a combination of red color light emission, green color light emission, blue color light emission and white color light emission; and wherein a length of a delay time between an emission of the white color light and an emission of any one of the blue color light, the red color light and the green color light differs from one light emission pattern to another.

* * * * *